March 18, 1924.
W. M. MANSFIELD
TRACTION VARYING MEANS FOR TRACTORS
Filed Aug. 12, 1920
1,487,257
2 Sheets-Sheet 1
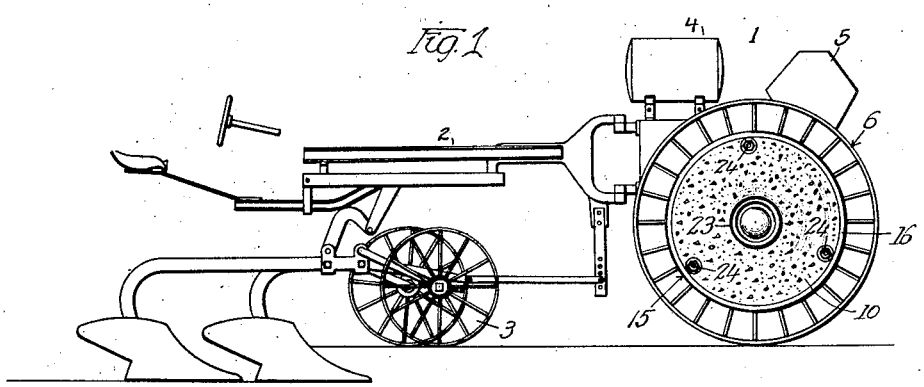
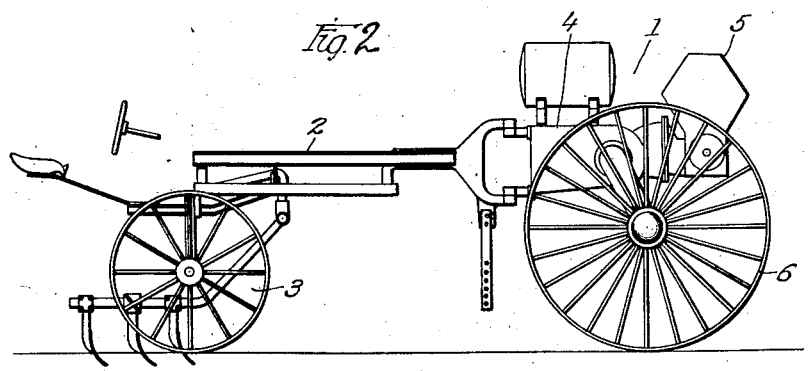
Inventor
Warren M. Mansfield
Leroy C. Shontz Atty.

March 18, 1924.
W. M. MANSFIELD
1,487,257
TRACTION VARYING MEANS FOR TRACTORS
Filed Aug. 12, 1920
2 Sheets-Sheet 2
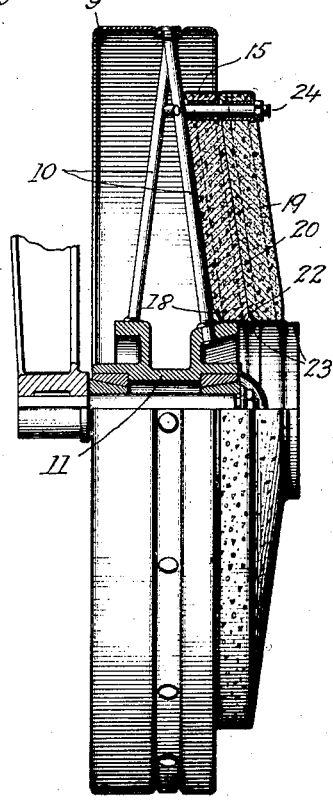
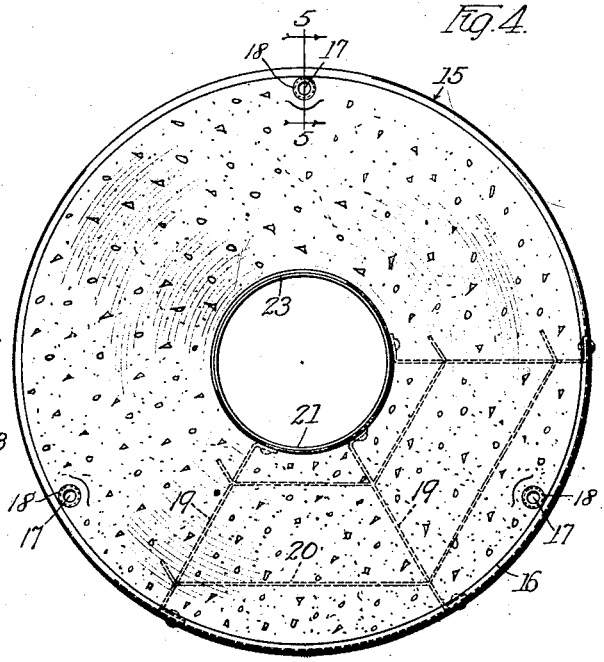
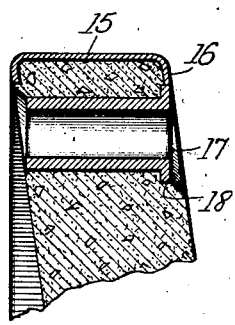
Inventor
Warren M. Mansfield Patented Mar. 18, 1924.

1,487,257

UNITED STATES PATENT OFFICE.

WARREN M. MANSFIELD, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTION VARYING MEANS FOR TRACTORS.

Application filed August 12, 1920. Serial No. 402,951.

*To all whom it may concern:*

Be it known that WARREN M. MANSFIELD, a citizen of the United States, residing at Moline, county of Rock Island, State of Illinois, have invented certain new and useful Improvements in Traction Varying Means for Tractors, of which the following is a specification.

The invention relates to traction varying means for tractors.

The tractive effort that may be exerted by a self-propelled vehicle is dependent upon the friction between the drive wheels of the vehicle and the surface upon which the vehicle rests. This frictional contact is always a function of the weight on the drive wheels. In a vehicle such as a motor truck, the problem of providing greater traction when a heavier load is to be pulled, solves itself, because, when a heavier load is carried, there is more weight on the drive wheels. In a tractor, however, the load that is hauled is put behind the tractor and the weight on the tractor wheels is approximately the same no matter what load is to be pulled.

A tractor for universal use on a farm, must be as light as possible in order that it may be used for work to which only a light tractor is suitable. At the same time, it must be capable of pulling heavy loads. When it is made light, it is difficult to get sufficient traction for pulling heavy loads and, when it is made heavy for pulling the large loads, it is too heavy for use in light work. The present invention has been devised to solve this problem.

The principal object of the invention is to provide improved means for varying the traction of a tractor.

A more specific object is to provide means for increasing the traction of a light tractor so that the tractor can pull a heavy load.

Other objects and advantages of the invention will hereinafter appear.

An embodiment of the invention is illustrated in the accompanying drawings in which, Figure 1 is a side view of a tractor arranged for heavy work, as for example, pulling plows.

Figure 2 is a side elevation of the same tractor used for light work such as pulling a cultivator.

Figure 3 is a rear view and partial section of one of the tractor drive wheels with weights attached thereto.

Figure 4 is a side view of one of the weights showing part of the construction in dotted lines.

Figure 5 is a section on the line 5—5 of Figure 4.

The invention is shown applied to a two wheel tractor of the unstable type in which the weight of the tractor parts is borne by the two tractor wheels which also act as drive wheels. It is to be understood that it may be also used with other tractors.

The tractor includes the forward driving unit 1 to which is pivotally connected a coupling unit 2 connected to an implement 3, the character of which varies with the type of work to be done.

The power unit includes a frame 4 enclosing transmission and drive mechanism and a motor 5 mounted on the frame for operating the drive wheels 6. The motor is preferably one having multiple cylinders and capable of running at a relatively high speed, the reason being that such a motor has greater power per unit weight. The various parts of the motor and frame are preferably made relatively light so that the tractor will not weigh any more than is necessary.

It has been found that a tractor of this type can be constructed having a draw-bar pull of approximately 2000 pounds at a speed of three miles per hour and weigh less than 2600 pounds. When, however, it is desired to draw 2000 pounds under unfavorable conditions, it is necessary that the weight on the tractor wheels be increased to as much as 4000 pounds when the ordinary tractor lugs are used. In order to obtain this increased weight on the tractor wheels when conditions are unfavorable, means have been provided for adding weight to the tractor wheels in such a way that the weight may be easily added and equally as easily removed so that it will be available at the time when it is desired.

The weight construction and the method of attachment are illustrated in detail in Figures 3, 4, and 5. The drive wheels to which the weights are attached have rims 9, spokes 10 and a hub 11. The weights are in the form of flat discs that are dished so as to fit close to the spokes. In the construction shown they are made of reinforced concrete as follows:

The metal frame comprises a retaining band 15 having flanges 16 extending inwardly on each side to hold the concrete in place to form a rim. Holes for the reception of retaining bolts are provided by metal bushings 17 as illustrated in Figures 3 and 5. The number of these bushings may be varied to suit the requirements and the location may likewise be varied so that they will be in the correct position for receiving the bolts to fasten the weights to the tractor wheels. Each bushing has a flange 18 to prevent it from being pulled through the weights as the bolts are tightened. The retaining band 15 is connected by arms 19 carrying concrete reinforcing means 20, to a hub 21 which is arranged to fit over a portion of the hub of the tractor wheel so as to automatically center the weight on the tractor wheel when it is applied.

The inner end of this hub is flared outwardly at 22 and the outer end is slightly contracted at 23 so that the weights may be centered on the tractor wheel hub and also so that one weight may be centered upon another.

The weights are held in place by hook bolts 24 which are of the necessary length required for fastening the desired number of weights on each wheel.

With this construction, one man can attach the traction weights, which may weigh as much as 200 pounds, to a tractor. He can roll them to a position adjacent the tractor wheels and then by means of rolling them on a block or the like, get them to a position where they can be easily slid over the hub of the drive wheel or if one weight is already in position, the next weight can be slid over the projecting hub of the first weight. The weights are thus held in position until they are bolted on. They may of course be equally as easily removed. It is evident that by means of these devices the traction of a light tractor may be increased so that it may be used for pulling heavy loads. This result is accomplished in a relatively inexpensive way and in a way that permits the change to be made with a minimum amount of work. Another important feature is that the weight is added to the wheels without adding any weight on the axles. This avoids having to make the axles and hubs heavy.

While the foregoing is the preferred construction it is to be understood that modifications may be made therein without departing from the spirit of the invention as defined in the claims.

What is claimed is:

1. The combination with a traction wheel, of a plurality of traction weights, the first of said weights being mounted directly on the wheel and the remaining weights being mounted successively on each other.

2. The combination with a traction wheel having a rim, hub, and spokes connecting the two, of a plurality of traction weights, the first of said weights being mounted on the hub and the remaining weights being mounted successively on each other, and means cooperating with the spokes for holding all of said weights in position.

3. The combination with a traction wheel, of a plurality of interchangeable traction weights mounted on said wheel, each of said weights having a centering means associated therewith, the centering means on the first weight serving to center the first weight on the wheel and the centering means on the other weights serving to center successive weights on each other.

4. The combination with a traction wheel having a rim, a hub, and spokes connecting the two, of a traction weight mounted on the hub and held in position by being fastened to the spokes.

5. The combination with a traction wheel having a rim, a hub, and spokes connecting the two, of a plurality of traction weights mounted on said hub in compact relation with the entire side of one weight contacting the entire side of another, and means for holding the weights in position.

6. The combination with a traction wheel having a rim, a hub, and spokes connecting the two in such a manner that a surface contacting the outer sides of all the spokes is convex of a concave traction weight mounted on said hub and fastened to said spokes.

7. The combination with a traction wheel having a rim, a hub, and spokes connecting the two so that a surface contacting the outer sides of all the spokes is convex of a plurality of interchangeable concave traction weights removably mounted on the hub and held in position by being fastened to the spokes.

8. The combination with a traction wheel having a rim, a hub, and spokes connecting the two so that a surface contacting the outer sides of all the spokes is convex of a plurality of concave traction weights having means for centering on the hub and on each other, and means for fastening the weights to the spokes.

9. A reinforced concrete traction weight for tractor wheels comprising a metal framework including a rim, a hub for centering the weight and for centering a succeeding weight upon it, and a concrete filling for said metal frame.

10. An article of manufacture comprising a reinforced concrete traction weight for tractor wheels having openings for the reception of bolts by means of which the weight may be secured to a tractor wheel, and a hub arranged to center the weight upon the tractor wheel and to center a succeeding weight when more than one weight is used upon the same wheel.

11. A weight for tractor wheels comprising a body portion and a hub, said hub projecting beyond the body portion at one end and having its other end constructed so as to fit over the projecting portion of a like hub on another weight.

In testimony whereof, I affix my signature.

WARREN M. MANSFIELD.